(12) United States Patent
Zhang et al.

(10) Patent No.: US 10,704,916 B2
(45) Date of Patent: Jul. 7, 2020

(54) METHOD AND SYSTEM FOR MAP MATCHING OF ROAD SIGN OBSERVATIONS

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 41 days.

(21) Appl. No.: 16/036,661

(22) Filed: Jul. 16, 2018

(65) Prior Publication Data

US 2020/0018604 A1    Jan. 16, 2020

(51) Int. Cl.
*G01C 21/30* (2006.01)
*G06K 9/62* (2006.01)
*G06K 9/00* (2006.01)

(52) U.S. Cl.
CPC ......... *G01C 21/30* (2013.01); *G06K 9/00476* (2013.01); *G06K 9/6202* (2013.01)

(58) Field of Classification Search
CPC .. G01C 21/30; G01C 21/3602; G06K 9/6202; G06K 9/00476
(Continued)

(56) References Cited

U.S. PATENT DOCUMENTS 5,948,042 A * 9/1999 Heimann ............... G01C 21/32
                                                        701/117
9,459,626 B2   10/2016 Chen et al.
(Continued)

FOREIGN PATENT DOCUMENTS

WO    2011047728 A1    4/2011

OTHER PUBLICATIONS

Yin et al., "A Weight-based Map Matching Method in Moving Objects Databases", Published 2004 in Proceedings. 16th International Conference on Scientific and Statistical Database Management, Jul. 2004, 2 pages.

*Primary Examiner* — Isaac G Smith
(74) *Attorney, Agent, or Firm* — Ditthavong & Steiner, P.C.

(57) ABSTRACT

A method, system, and computer program product is provided, for example, for matching a road sign observation information on a map application. The method may include receiving the road sign observation information. The method may further include identifying a plurality of candidate links based on a first distance between a location of the road sign observation information detection and a plurality of shape points. Additionally, the method may include calculating a heading difference between each of the plurality of candidate links and the location of the road sign observation information detection. Furthermore, the method may include identifying one or more qualified links from the plurality of candidate links, wherein the heading difference between each of the one or more qualified links from the plurality of candidate links and the location of the road sign observation information detection is within a predetermined heading difference threshold. Also, the method may include matching the road sign observation information to at least one of the one or more qualified links based on a second distance. Finally, the method may include changing the map-matched link from the candidate link to its downstream link if the road sign is too close to the end of the map-matched candidate link.

20 Claims, 6 Drawing Sheets

(58) Field of Classification Search
USPC .................................................. 701/410, 446
See application file for complete search history.

(56) References Cited

U.S. PATENT DOCUMENTS

| | | |
|---|---|---|
| 9,746,331 B1 | 8/2017 | Yu et al. |
| 2017/0154229 A1* | 6/2017 | Yoshitomi .......... G08G 1/09623 |
| 2018/0023959 A1 | 1/2018 | Ivanov et al. |

* cited by examiner

| TRAFFIC SIGN OBSERVATIONS | LatT, LonT | 201 | TSR LATITUDE AND LONGITUDE |
| --- | --- | --- | --- |
| | HT | 203 | TSR HEADING |
| RMOB LINK | L | 205 | LINK ID |
| | FC | 207 | FUNCTIONAL CLASS OF THE LINK, RANGE FROM 1 TO 5 |
| | LatU, LonU | 209 | UPSTREAM NODE LATITUDE AND LONGITUDE |
| | LatD, LonD | 211 | DOWNSTREAM NODE LATITUDE AND LONGITUDE |
| RMOB SHAPE | LatS$_i$, LonS$_i$ | 213 | SHAPE POINT LATITUDE AND LONGITUDE. i IS THE SEQUENCE NUMBER FOR THE SHAPE POINTS WHICH START FROM 1. THE SMALLER i IS, THE CLOSER THE SHAPE POINT IS TO THE UPSTREAM NODE. |

FIG. 2

| SCENARIO 1 | SCENARIO 2 | SCENARIO 3 | SCENARIO 4 |
|---|---|---|---|
| THERE IS ONLY ONE DOWNSTREAM LINK: | THERE ARE TWO OR MORE DOWNSTREAM LINKS: | THERE ARE NO DOWNSTREAM LINKS: | THERE IS A RAMP OF FREEWAY IN THE DOWNSTREAM LINKS: |
| 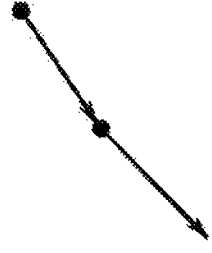 501 | 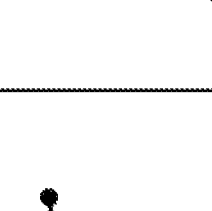 503 | 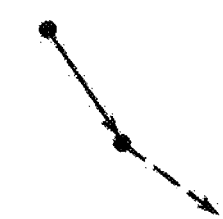 505 |  507 |
| WE SELECT THIS DOWNSTREAM LINK AS THE MAP-MATCHED LINK. | WE SELECT THE DOWNSTREAM LINK WHOSE UPSTREAM HEADING* IS CLOSEST TO THE SIGN OBSERVATION HEADING. | WE CAN ONLY SELECT THE CURRENT MAP-MATCHED LINK. | WE FOLLOW THE CRITERIA IN SCENARIO 2 AND THE POSSIBLE ERRORS CAN BE FIXED BY A SEPARATE RAMP ALGORITHM. |

FIG. 5

METHOD AND SYSTEM FOR MAP MATCHING OF ROAD SIGN OBSERVATIONS

TECHNOLOGICAL FIELD

The present disclosure generally relates to a system and method for providing assistance to a driver of a vehicle or the vehicle itself, and more particularly relates to a system and method for matching of road sign observations on a link to a map database.

BACKGROUND

Map based applications are used in many navigation applications in vehicles. The map can be used as a source of speed limit information, traffic sign information, variable speed signs (VSS) related information, and direction related information for traffic signs, such as speed signs posted on gantries and the like. The navigation applications rely on map data for performing various navigation assisted functions. Thus, the map database should be provided with accurate and up-to-date data.

The map database may receive data related to road signs, such as traffic signs, such as traffic signs posted on gantries, roadway segments, freeways, road sides and the like, via ingestion of vehicle smart sensor data (sensor data) and analysis, coding and distribution of relevant information derived from the sensor data and conflated with other sources. Thus, using data from vehicle sensors, the map database can be updated daily.

However, vehicle sensors, such as GPS sensors may not be very accurate in reporting data related to road signs, leading to errors in map database data.

BRIEF SUMMARY

In light of the above-discussed problems, there is a need to derive accurate data related to road signs, using information sources other than only the vehicle sensors, such as GPS sensors.

The method and systems disclosed herein provide for map-matching of road sign or traffic sign observations with their headings on to correct links, such as Relational Map Object Base (RMOB) links. The map-matching is designed to build an auto-pilot map for autonomous vehicles with accuracy. This requires a unique map matcher specifically for the problem of learning road signs from vehicle observations. Generally, map-matching of road signs suffers from some drawbacks, such as GPS errors, no consideration for traffic sign placement problem and challenges.

In an example embodiment, a method for matching a road sign observation on a map application is provided. The method comprises receiving the road sign observation information. The method further comprises identifying a plurality of candidate links based on a first distance between a location of the road sign observation information detection and a plurality of shape points. Additionally, the method comprises calculating, by a processor, a heading difference between each of the plurality of candidate links and the location of the road sign observation information detection. Furthermore, the method comprises identifying one or more qualified links from the plurality of candidate links, wherein the heading difference between each of the one or more qualified links from the plurality of candidate links and the location of the road sign observation information detection is within a predetermined heading difference threshold. Also, the method comprises matching the road sign observation information to at least one of the one or more qualified links based on a second distance.

In some example embodiments, an apparatus may be provided. The apparatus may include at least one processor and at least one memory including computer program code for one or more programs. The at least one memory and the computer program code configured to, with the at least one processor, cause the apparatus to at least receive a road sign observation information. The apparatus may be further caused to identify a plurality of candidate links based on a first distance between a location of the road sign observation information detection and a plurality of shape points. Further, the apparatus may be caused to calculate a heading difference between each of the plurality of candidate links and the location of the road sign observation information detection. Additionally, the apparatus may be caused to identify one or more qualified links from the plurality of candidate links, wherein the heading difference between each of the one or more qualified links from the plurality of candidate links and the location of the road sign observation information detection is within a predetermined heading difference threshold. Also, the apparatus may be caused to match the road sign observation information to at least one of the one or more qualified links based on a second distance.

In some example embodiments a computer program product is provided. The computer program product comprising at least one non-transitory computer-readable storage medium having computer-executable program code instructions stored therein, the computer-executable program code instructions comprising program code instructions for receiving. The computer-executable program code instructions further comprising program code instructions for receiving a road sign observation information. The computer-executable program code instructions further comprising program code instructions for identifying a plurality of candidate links based on a first distance between a location of the road sign observation information detection and a plurality of shape points. Additionally, the program code instructions cause calculating a heading difference between each of the plurality of candidate links and the location of the road sign observation information detection. Further, the computer program code comprising program code instructions for identifying one or more qualified links from the plurality of candidate links, wherein the heading difference between each of the one or more qualified links from the plurality of candidate links and the location of the road sign observation information detection is within a predetermined heading difference threshold. The computer program code further comprising program code instructions for matching the road sign observation information to at least one of the one or more qualified links based on a second distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
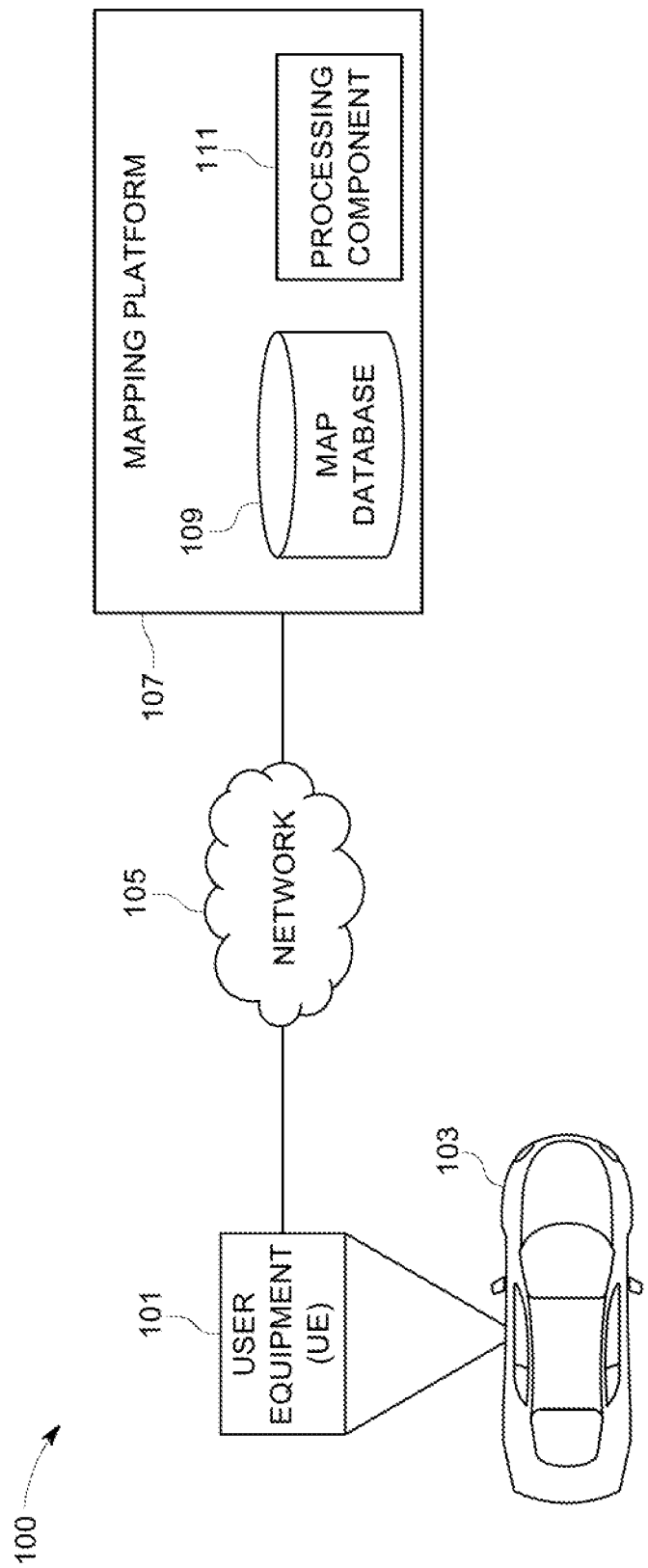
Figure 3:
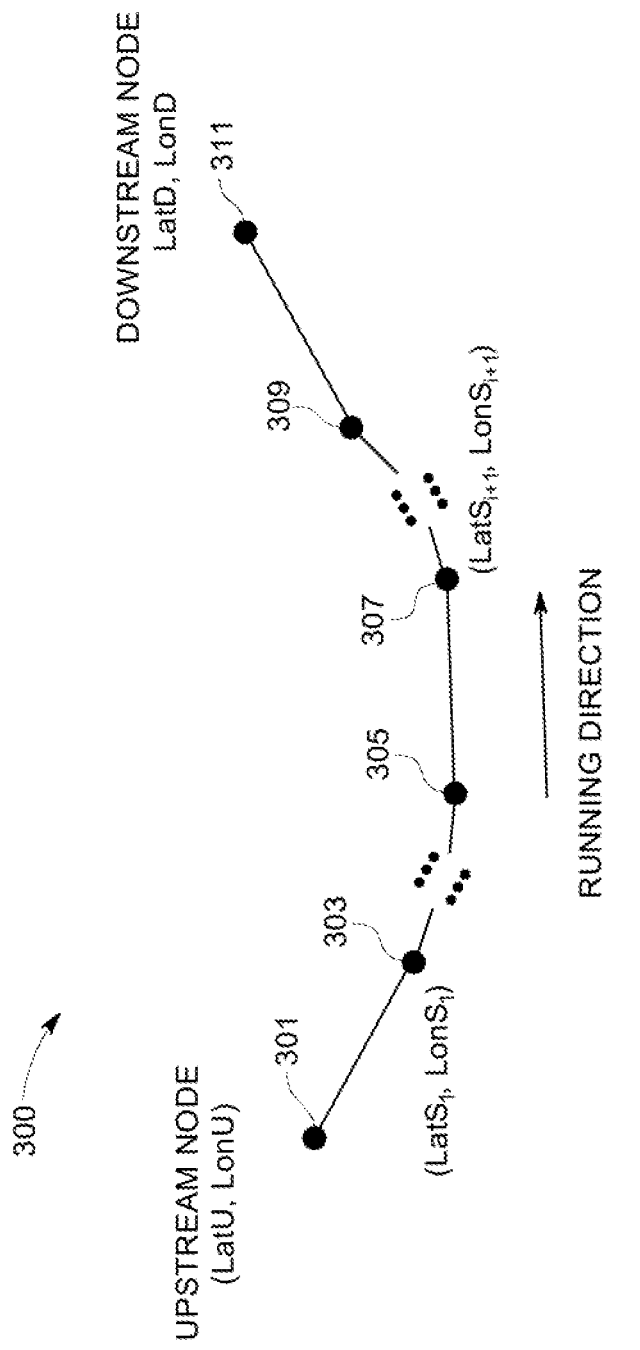
Figure 4:
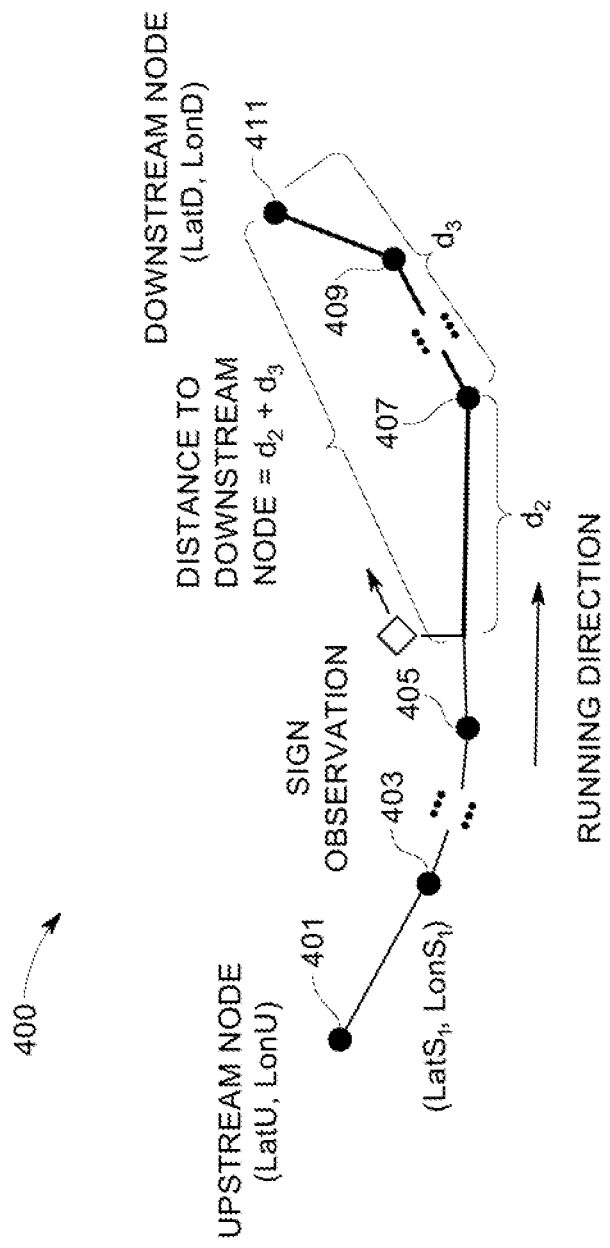
Figure 6:
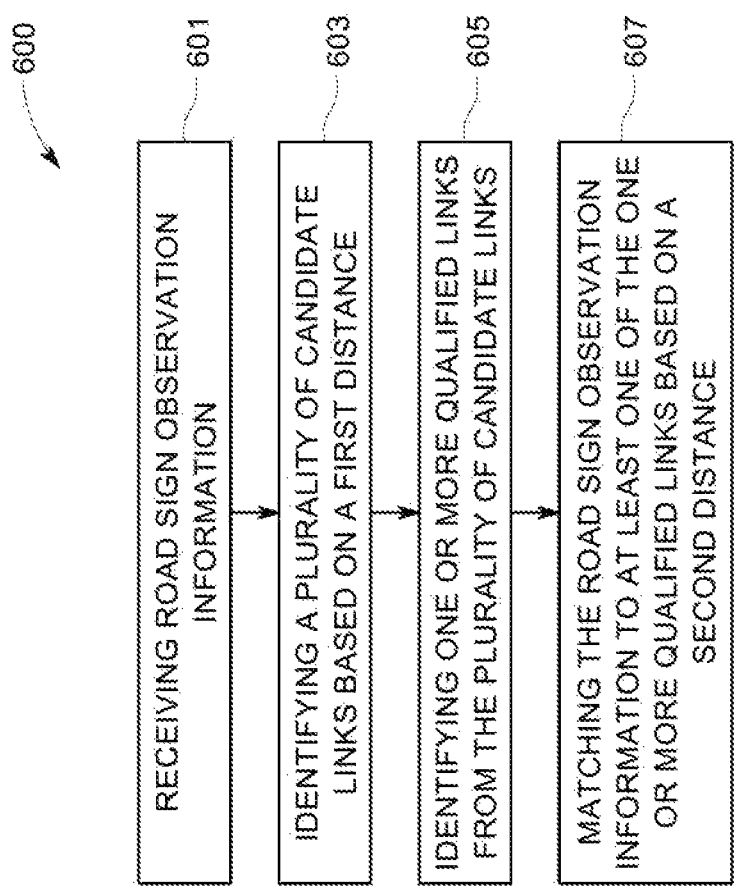

Having thus described example embodiments of the invention in general terms, reference will now be made to the accompanying drawings, which are not necessarily drawn to scale, and wherein:

FIG. 1 illustrates a block diagram of a system for providing road sign observation information matching in accordance with an example embodiment;

FIG. 2 illustrates a diagram of a data record stored in a map database in accordance with an example embodiment;

FIG. 3 illustrates an exemplary diagram illustrating a geometrical representation of a link and associated shape points road sign matching according to an example embodiment;

FIG. 4 illustrates an exemplary diagram illustrating a geometrical representation of distance parameters for road sign observation matching according to an example embodiment;

FIG. 5 illustrates an exemplary diagram illustrating a geometrical representation of link adjustment parameters scenarios for downstream link selection for road sign observation matching according to an example embodiment;

FIG. 6 illustrates a flow diagram of a method for road sign observation matching according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Definitions

The term "link" may be used to refer to any connecting pathway including but not limited to a roadway, a highway, a freeway, an expressway, a lane, a street path, a road, an alley, a controlled access roadway, a free access roadway and the like.

The term "shape point" may be used to refer to shape segments representing curvature information of various links, such as roadway segments, highway segments, roads, expressways and the like. Each shape point may be associated with coordinate information, such as latitude and longitude information. The intersections of shape points may be represented as nodes.

The term "node" may be used to refer to a point, such as a point of intersection between two line segments, which in some cases may be link segments.

The term "upstream link" may be used to refer to a link in a running direction or direction of travel of a vehicle.

The term "downstream link" may be used to refer to a link opposite to a running direction or direction of travel of a vehicle.

The term "heading" may be used to provide a measure of a direction for a point or a line and may be calculate relative to a north direction or a line-of-sight direction, as may be applicable.

A method, apparatus, and computer program product are provided herein in accordance with an example embodiment for providing heading related information for vehicles in general. The heading related information for vehicles is derived from a heading value of a gantry, which is calculated on the basis of limited amount of location coordinate information available in a map database. The heading related information and thus heading value of gantry may then be updated in the map database for use in navigation related applications using the map database. These navigation related applications may include such as route guidance, assisted driving functions, autonomous driving assistance in a vehicle and the like.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

FIG. 1 illustrates a block diagram of a system 100 for providing road sign observation information matching in accordance with an example embodiment. The system may include a user equipment 101 installed in a vehicle 103 for detecting the road sign observation information. The vehicle 103 may include one or more sensors for taking the road sign observation. The road sign observation may be related to one or more road signs, such as a traffic sign, a gantry, a poster, a banner, an advertisement flyer, an LCD display, a direction signboard, a destination signboard, a speed limit sign, a variable speed limit sign (VSS) and the like. Thus, the road sign may either be a traffic information related sign or a non-traffic information related sign. In some instances, the vehicle 103 may take the road sign observation in such a manner that a non-traffic information related sign, such as a picture, may be misclassified as a traffic information related sign, leading to errors. In some example embodiments, these errors may be due to one or more sensors installed in the vehicle, such as the GPS sensor errors.

In some example embodiments, GPS errors may lead to inaccurate identification of road sign locations and incorrectly easily map-matching road signs to wrong links. For example, map-matching road signs onto curved links are usually inaccurate if the road sign observation is simply based on GPS sensor information, such as GPS co-ordinates. In such cases, accuracy may be improved by using both a heading information of the road sign and shape files of the link to solve the problem.

In some example embodiments, road signs located on the entrance of a target link are easily map-matched to an upstream link, which is a link in a direction of travel of the vehicle 103 and this problem is more severe if the target link is in short length. The system 100 may be configured to employ the connectivity features of links to counter this problem.

In some example embodiments, the vehicle 103 may report its location when it observes a road sign. However, the road sign may be on a parallel road or on a ramp for example. The vehicle 103 may report the sign observation event when the sign exits the field of view of one or more vehicle sensors, such as the vehicle's camera.

The vehicle's 103 user equipment 101 may be connected to a mapping platform 107 over a network 105. The mapping platform 107 may include a map database 109 and a processing component 111.

The network 105 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of the vehicle 103.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user.

The mapping platform 107 may include a map database 109, which may include node data, road segment data, link data, point of interest (POI) data, link identification information, heading value records or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. The navigation device may be used to perform navigation-related functions that can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 107 may be a master geographic database configured at a server side, but in alternate embodiments, a client side-mapping platform 107 may represent a compiled navigation database that may be used in or with end user devices (e.g., user equipment 101) to provide navigation and/or map-related functions. For example, the mapping platform 107 may be used with the end user device 101 to provide an end user with navigation features. In such a case, the mapping platform 107 can be downloaded or stored on the end user device (user equipment 101) which can access the mapping platform 107 through a wireless or wired connection, over the network 105. This may be of particular benefit when used for navigating within spaces that may not have provisions for network connectivity or may have poor network connectivity, such as an indoor parking facility, a remote street near a residential area and the like. As many parking facilities are multi-level concrete and steel structures, network connectivity and global positioning satellite availability may be low or non-existent. In such cases, locally stored data of the mapping platform 107 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, direction of travel of vehicle, heading of vehicles and the like. The direction of travel of the vehicle may be derived based on the heading value associated with a gantry on a link, such as a roadway segment.

FIG. 2 illustrates a diagram of a data record 200 stored in a map database in accordance with an example embodiment.

The record 200 may include a data component 201. LatT, LonT, which may be used to store latitude and longitude information respectively for a location for taking road sign observation. In some example embodiments, the road sign observation may be related to a traffic sign observation, TSR.

The record 200 may further include a data component 203, HT, which may be used to store a heading information for the location of taking the road sign observation, such as the heading of a vehicle at the time of taking the traffic sign observation information The record 200 may further include a data component 205, L, which may be used to store a link ID. For example an upstream link ID or a downstream link ID which may be used to uniquely identify the link.

The record 200 may further include a data component 207, FC, which may be used to store functional class of the link. The functional class may be anything from 1 to 5, which is generally denoted as FC1, FC2, FC3 and the like.

The record 200 may further include a data component 209, LatU, LonU, which may be used to store geographical co-ordinates, that is to say latitude and longitude information for an upstream node.

The record 200 may further include a data component 211, LatD, LonD, which may be used to store geographical co-ordinates, that is to say latitude and longitude information for a downstream node.

The record 200 may further include a data component 213, LatSi, LonSi, which may be used to store geographical co-ordinates, that is to say latitude and longitude information for a shape point, which are sequenced from i, starting from I. The smaller i is, the closer the shape point is to the upstream node.

In some example embodiments, for the latitude and longitude of upstream and downstream node, their Link ID may be annotated on its up right corner. For instance: $LatU^L$ may be the latitude of upstream node in the link L. For latitude and longitude of shape points, annotate its sequence on the down right corner. For instance, $LatS_i^L$ is the latitude of ith shape in Link L. Also, we use [ ] to indicate the collections. For instance, [L] indicates all the links in an area.

The record 200 may be stored in the form of a suitable data structure in the map database 109.

In some example embodiments, the map database 109 may include many such records. For example, the map database 109 may include a collection of records storing various parameters for obtaining road sign observations.

The map database 109 may also store information related to shape points, coordinate information for different shape points, link identification related information and the like, in the form of different records in the map database 109.

The data records may be used in calculating various parameters included in the accurate identification of a road sign and map-matching of the road sign to its correct link according to the methods and systems disclosed in the example embodiments discussed herein.

FIG. 3 illustrates an exemplary diagram illustrating a geometrical representation of a link and associated shape points for road sign matching according to an example embodiment.

As illustrated in FIG. 3, a link 300 may include a plurality of link segments formed between a plurality of nodes 301-311. The figure also denotes a running direction which may denote a direction in which the vehicle, such as the vehicle 103 may be running at the time of taking a road sign observation. The first node in the running direction, 301, may be known as the upstream node and the last node in the running direction, 311 may be known as the downstream node, for the link 300 depicted in FIG. 3. The coordinates of the upstream node may be known, such as from the record 200, stored in the map database 109. The coordinates of the upstream node 301 may be denoted as (LatU,LonU).

The coordinates of the downstream node 309 may also be known, such as from the record 200 stored in the map database 109, and may be denoted as (LatD,LonD).

The link segments formed by the intermediate nodes 303-309 each define various shape points, which are modeled according to the geometry of the link 300. The coordinates of each of the shape points may also be known, by defining the coordinates of the intermediate nodes forming a shape point. For example, the link segment formed between the nodes 301-303 may be denoted as a shape point St. The coordinates of the nodes 301 and 303 may be used to define the shape point $S_1$. As the coordinates of the node 301, which is the upstream node have already been discussed, the coordinates of the node 303 may also be known, such as by virtue of being available in the map database 109 records, and may be depicted as $(LatS_1, LonS_1)$. Similarly, the shape points may be numbered along the link segments progressively. For example, the coordinates of the i+1th node, node 307 in this case, may define the shape point $S_{i+1}$, and may be depicted as: $(LatS_{i+1}, LonS_{i+1})$.

The shape points may be numbered starting from 1 and may be referenced with index i for the purpose of discussion throughout this disclosure, wherein the smaller is the value of i, the closer the shape point is to the upstream node 301, the downstream node 311, and the various shape points may be used in performing various calculations for matching a road sign observation taken on one or the link segments of the link 300 with correct map location, also hereinafter referred to as map-matching.

In some example embodiments, the map-matching may include a set of candidate links extraction, wherein a candidate link in the set may be a link segment which meets a predefined criteria to belong to a set of possible links for map-matching the road sign observation. The candidate link extraction may include calculating of Euclidean distances between the location of taking the road sign observation and all the shape points in a selected area.

Then, shape points whose distances are smaller than a first distance, hereinafter also referred to as a first distance threshold $d^1$ are selected as the candidate shape points $[CLatS_i^L, CLonS_i^L]$ and the corresponding links are taken as the candidate links $\{CL\}$.

$$\{CLatS_i^L, CLonS_i^L\} = [LatS_i^L, LonS_i^L | \sqrt{(LatT-LatS_i^L)^2 + (LatT-LatS_i^L)^2} \leq d^1]$$

$$\{CL\} = [L | \sqrt{(LatT-LatS_i^L)^2 + (LatT-LatS_i^L)^2} \leq d^1]$$

Wherein, i in $CLatS_i^L$ indicates the sequence of the shape points in link L and T denotes a point representing a location for taking the road sign observation or traffic sign observation.

In some example embodiments, the first distance threshold $d^1$ can be set as a large number such as 100 meters.

In some example embodiments, the first distance threshold $d^1$ may be in a range of 60 meters-300 meters.

Once the set of candidate links has been extracted, a heading filtering is performed on road sign observations.

In performing heading filtering, a heading difference between the road sign observation and each link of the set of plurality of candidate links is calculated. As discussed previously, each link is divided by the shape points into several link segments. The sequence of shape point that is closest to upstream node is 301 as shown in the FIG. 3. In order to calculate the heading difference, the heading of the candidate shape points $[CLatS_i^L, CLonS_i^L]$ is calculated first. Further, the candidate shape point is paired with one of its next shape point $[CLatS_{i+1}^L, CLonS_{i+1}^L]$.

Then, one or more qualified link segments are identified from the set of plurality of candidate links such that for the qualified link segments, their heading should be similar to that of the road sign observation. The similarity of headings is established on the basis of identification of a heading difference between the heading of each of plurality of candidate link shape points the road sign observation. In some example embodiments, the heading different threshold may be set as $h^1$. As the heading of a road sign is calculated as its degree difference from the due north, the heading difference between the road sign and link segments should be either less than $h^1$ or higher than $360-h^1$.

Heading of a candidate shape point $\{CLatS_i^L, CLonS_i^L\}$ can be calculated as the degree difference between the due north and the line formed by $\{CLatS_i^L, CLonS_i^L\}$ and $\{CLatS_{i+1}^L, CLonS_{i+1}^L\}$ as:

$$X = CLonS_{i+1}^L - CLonS_i^L$$
$$Y = CLatS_{i+1}^L - CLatS_i^L$$

$$CHS_i^L = \begin{cases} \arccos\left(\dfrac{Y}{\sqrt{X^2+Y^2}}\right) & \text{if } X \geq 0 \\ 360 - \arccos\left(\dfrac{Y}{\sqrt{X^2+Y^2}}\right) & \text{if } X < 0 \end{cases}$$

Where $CHS_i^L$ is the heading of the candidate shape points which is the ith shape point in the link L.

In this manner, heading filtering is continued and those candidate shape points and links are selected whose heading difference between heading of the road sign observation, HT and heading of the shape point $HS_i^L$ is smaller than $h^1$ or higher than $360-h^1$:

$$\{CLatS_i^L, CLonS_i^L\} = \{CLatS_i^L, CLonS_i^L || HT-CHS_i^L| \leq h^1 \text{ or } |HT-CHS_i^L| \geq 360-h^i]$$

$$\{CL\} = \{CL || HT-CHS_i^L| \leq h^1 \text{ or } |HT-CHS_i^L| \geq 360-h^i]$$

In some example embodiments, $h^1$ may be set to about 30 degrees.

In some example embodiments, $h^1$ may be set to be in a range of 10 degrees to 50 degrees.

Once, the one or more qualified links have been identified based on the heading filtering, map-matching of the road sign observation to one of the one or more qualified links is performed.

In some example embodiments, the map-matching is performed on the basis of a second distance criteria. Specifically, in selecting the map-matched link from the candidate links $\{CL\}$, following 2 steps are performed:

1) First, for each qualified link from the set of candidate links, we calculate all the point-to-line distances between the road sign observation to all its link segments and choose the smallest point-to-line distance as the distance from the road sign observation to the qualified link;

2) Second, we compare the distances from the road sign observation to all qualified links and select the qualified link with the smallest distance as the map-matched link.

The calculation of point-to-line distances is done on the basis of a basic point-to-line distance calculation method to calculate the minimum distance between a given location to line with origin and destination on the basis of the following algorithm:

---

Point-to-line distance calculation method: f(InputX1, InputY1, InputX2, InputY2, X3, Y3)

Input: InputX1, InputY1, InputX2, InputY2, X3, Y3 (InputX1 ≤ InputX2)
Output: d
If Input X1 ≥ X3,
  $d = \sqrt{(InputX1-X3)^2 + (InputY1-Y3)^2}$
If Input X2 ≤ X3,
  $d = \sqrt{(InputX2-X3)^2 + (InputY2-Y3)^2}$
If Input X1 ≤ X3 ≤ Input X2:

$$d = \frac{|a \cdot X3 + b \cdot Y3 + c|}{sqrt(a^2+b^2)}$$

where:
a = InputY1 − InputY2; b = InputX2 − InputX1;
c = InputX1 · InputY2 − InputX2 · InputY1

---

Where X1 and X2 may be used to represent two input functions InputX1 and Input X2 defining input x-coordinates of two points X1, Y1 and X2, Y2.

Further, Y1 and Y2 may be used to represent two input functions InputY1 and InputY2 defining input y-coordinates of two points X1, Y1 and X2,Y2.

Where (X1,Y1) and (X2,Y2) are the consecutive shape locations of the link segment for calculating distance between the line defining the link segment and a point (X3,Y3) specifying a location for taking the road sign observation.

Based on the calculations, the smallest value of d is taken as the second distance, and the road sign observation is map-matched to the qualified link at distance d as identified on the basis of the calculations.

Once map-matching of the road sign observation to an appropriate qualified link is done, adjusting the matched qualified link to identify at least one of an upstream link and a downstream link as a matched link for the road sign observation information is performed based on an adjustment criteria.

In some example embodiments, it may be observed that the actual road sign, such as a traffic sign is usually placed at the entrance of the link, and thus, the traffic sign observations are generally located in the upstream of the correct link. This is mainly due to that when a road sign observation system on the vehicle sees the traffic sign, they are usually running towards the traffic sign and thus the vehicle locations, usually recorded as the traffic sign observation locations, are in the upstream of the traffic sign. However, in some cases this may not be true and some adjustments might be needed to be made to find the correct map-matched link of the traffic sign observation. In general, there may be mainly two scenarios to adjust:

In the first scenario, the map-matched link is short, usually less than 15 meters. In this case, if the traffic sign observation is located from 50th percentile to 100th percentile of the link, the connected downstream link needs to be selected as the correct map-matched link.

In the second scenario, the map-matched link is longer than 15 meters. In this case, if the traffic sign observation is located from 75th percentile to 100th percentile of the link, then again the connected downstream link needs to be selected as the correct map-matched link.

In both scenarios, a sign distance to the downstream node of the link needs to be calculated as shown in as illustrated in FIG. 4.

FIG. 4 illustrates an exemplary diagram illustrating a geometrical representation of distance parameters for road sign observation matching and map-matched link adjustment according to an example embodiment.

FIG. 4 illustrates the same scenario as depicted in FIG. 3, but with specific markings for showing various calculation parameters involved in map-matching. The FIG. 4 scenario illustrates a link 400, with an upstream node 401, a downstream node 411 and various intermediate nodes 403-409. The various coordinates of nodes 401-411 and various shape points on the link 400 follow the same notations as depicted in FIG. 3. The coordinates of the upstream node are (LatU, LonU) the coordinates of the downstream node are (LatD, LonD) and the coordinates for ith shape point are denoted as $(LatS_i, LonS_i)$, where i starts from 1.

FIG. 4 also illustrates a location 405 for taking a road sign observation. For example a vehicle may be at the location 405 at the time of taking the road sign observation, such as observing a traffic sign or a variable speed limit sign VSS.

The distance between the location 405 and the downstream node 411 is the distance to the downstream node. As depicted in FIG. 4, the distance to the downstream node is given by $d_2+d_3$, where $d_2$ and $d_3$ are distance values.

In some example embodiments, the distance to the downstream node and a percentile value ρ of the link, as discussed previously for link adjustment, may be calculated on the basis of the following algorithm:

---

Method to calculate the percentile value of a road sign observation for a map-matched link

---

Input: LatT, LonT of the road sign observation
  LatU, LonU, LatD, LonD and $[LatS_i, LonS_i]$ of a link
Output: ρ
For each $LatS_i$ calculate point-to-line distance:
  $f^i(LatS_i, LonS_i, LatS_{i+1}, LonS_{i+1}, LatT, LonT)$ Select target sequence number: $Ti = \left(i \mid \underset{i}{\operatorname{argmin}}(f^i)\right)$ Select target shape point: $[LatS_{Ti}, LonS_{Ti}] = \left([LatS_i, LonS_i] \mid \underset{i}{\operatorname{argmin}}(f^i)\right)$ Calculate the distance from the shape point $[LatS_{Ti+1}, LonS_{Ti+1}]$ to sign observation:
  $d_1 = \operatorname{sqrt}((LonT - LonS_{Ti+1})^2 + (LatT - LatS_{Ti+1})^2)$
Calculate the distance from the shape point $[LatS_{Ti+1}, LonS_{Ti+1}]$ crossing point, which is the point between the ith link segment and the vertical line of the sign observation:
  $d_2 = \operatorname{sqrt}(d_1^2 - (f^{Ti}(LatS_{Ti}, LonS_{Ti}, LatS_{Ti+1}, LonS_{Ti+1}, LatT, LonT))^2)$
Calculate the total Euclidean distance of segments from $(LatS_{Ti}, LonS_{Ti})$ to the link end: $d_3$;
Calculate the total Euclidean distance of all segments of the link: d;
Calculate the percentile value: $p = (d_2 + d_3)/d$.*

---

*$d_2$ and $d_3$ is illustrated in the FIG. 4

---

Once the distance to the downstream node has been calculated, the map-matched road sign observation may be moved to the downstream link if it qualifies the following two criteria:

if($d \leq 0.00015$ & $p \leq 0.5$)|($d > 0.00015$ & $p \leq 0.25$)

Once the road sign observation has been found to satisfy the above criteria, the qualified link may be moved to the set of downstream links to select a proper downstream link under different scenarios as illustrated in FIG. 5.

FIG. 5 illustrates an exemplary diagram illustrating a geometrical representation of link adjustment parameters scenarios 500 for downstream link selection for road sign observation matching according to an example embodiment.

The scenarios 500 may include a scenario 1, 501, when there is only one downstream link satisfying the link adjustment conditions discussed in conjunction with FIG. 4. In such a scenario, the only downstream link is selected as the map-matched link.

The scenarios 500 may include a scenario 2, 503, when there are two or more downstream links satisfying the link adjustment conditions discussed in conjunction with FIG. 4. In such a scenario, the downstream link whose upstream heading is closest to the heading of the road sign observation is selected as the map-matched link.

The scenarios 500 may further include a scenario 3, 505, when there is no downstream link satisfying the link adjustment conditions discussed in conjunction with FIG. 4. In such a scenario, the current map-matched link is selected as the map-matched link.

The scenarios 500 may further include a scenario 4, 507, when there is a ramp of freeway in the downstream link satisfying the link adjustment conditions discussed in conjunction with FIG. 4. In such a scenario, the selection criteria of scenario 2, 503, is followed and possible errors may be fixed by separate ramp algorithms.

Thus, using the scenarios depicted in FIG. 5 an appropriate downstream link may be selected as the map-matched link for the road sign observation if so required, using the methods and systems disclosed herein.

FIG. 6 illustrates a flow diagram of a method 600 for road sign observation matching according to an example embodiment.

The method 600 may include, at 601, receiving a road sign observation information. In some example embodiments, the road sign observation information may be related to a traffic sign. However, in some example embodiments, the road sign observation information may be related to a non-traffic related sign, such as a flyer, a banner, a lane marking and the like. The road sign observation information may be received by a navigation related equipment, such as the user equipment 101 depicted in FIG. 1, which may be installed in the vehicle 103.

The method 600 may further include, at 603, identifying a plurality of candidate links for map-matching the received road sign observation information based on a first distance. In some example embodiments, the first distance may be the distance $d^1$ as discussed previously in conjunction with FIG. 3. Based on the identification of the candidate links whose first distance is within a first distance threshold from the road sign observation, at 605, one or more qualified links may be further identified from the candidate links.

In some example embodiments, the qualified links may be the links which qualify a heading difference based criteria as discussed previously in conjunction with FIG. 3. That is to stay, the qualified links may be the links for which the heading difference between each of the one or more qualified links selected from the plurality of candidate links and the location of the road sign observation information detection is within a predetermined heading difference threshold. Once the set of qualified links has been identified, the method 600 may include, at 607, matching the road sign observation information to at least one of the one or more qualified links based on a second distance.

In some example embodiments, the second distance may be the a point-to-line distance between the location of taking the road sign observation and each of the one or more qualified links, as discussed in conjunction with FIG. 3.

After matching the road sign observation to a qualified link, an adjustment of the map-matched link may be performed on the basis of the scenarios discussed in conjunction with FIGS. 4 & 5.

In some example embodiments the method may include changing the map-matched qualified link from the candidate link to its downstream link if the road sign is too close to the end of the map-matched qualified link. The map-matched link may be too close such as when the distance of the candidate link is the smallest point-to-line distance for it to qualify as the map-matched qualified link.

In an example embodiment, an apparatus for performing the method 600 of FIG. 6 above may comprise a processor (e.g. the processor 111) configured to perform some or each of the operations of the method of FIG. 6 described previously. The processor may, for example, be configured to perform the operations (601-607) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-607) may comprise, for example, the processor 111 which may be implemented in the user equipment 101 and/or a device or circuit for executing instructions or executing an algorithm for processing information as described above.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by one or more sensors associated with a vehicle, a road sign observation information;
   identifying a plurality of candidate links based on a first distance between a location of the road sign observation information detection and a plurality of shape points;
   calculating, by a processor, a heading difference between each of the plurality of candidate links and the location of the road sign observation information detection;
   filtering one or more qualified links from the plurality of candidate links based on determining that the heading difference is within a predetermined heading difference threshold;
   matching the road sign observation information to at least one of the one or more qualified links based on a second distance; and
   initiating an update of a map database with the at least one or more matched qualified links.

2. The method of claim 1, wherein matching the road sign observation information further comprises:

calculating, by the processor, a plurality of point-to-line distances between each of the one or more qualified links and the location of the road sign observation information detection;
selecting a smallest value of a point-to-line distance from the plurality of point-to-line distances as the second distance; and
matching the road sign observation information to the at least one of the one or more qualified links based on the second distance.

3. The method of claim 2, further comprising:
adjusting the matched one or more qualified links to identify at least one of an upstream link and a downstream link as a matched link for the road sign observation information based on an adjustment criteria.

4. The method of claim 3, wherein the adjustment criteria comprises:
checking a length of the one or more qualified links selected for matching the at least one of the upstream link and the downstream link with the road sign observation information; and
selecting the downstream link as the matched link for the road sign observation information if the length of the one or more qualified links is lesser than a predetermined length threshold and the location of the road sign observation information detection is within 50th percentile to 100th percentile of the one or more qualified links.

5. The method of claim 3, wherein the adjustment criteria comprises:
checking a length of the one or more qualified links selected for matching the at least one of the upstream link and the downstream link with the road sign observation information; and
selecting the downstream link as the matched link for the road sign observation information if the length of the one or more qualified links is greater than a predetermined length threshold and the location of the road sign observation information detection is within 75th percentile to 100th percentile of the one or more qualified links.

6. The method of claim 1, wherein the first distance is in a range of 60 meters to 300 meters.

7. The method of claim 1, wherein the heading difference threshold is in a range of 10 degrees to 50 degrees.

8. An apparatus comprising:
at least one processor; and
at least one memory including computer program code for one or more programs, the at least one memory and the computer program code configured to, with the at least one processor, cause the apparatus to perform at least the following:
receive, by one or more sensors associated with a vehicle, a road sign observation information;
identify a plurality of candidate links based on a first distance between a location of the road sign observation information detection and a plurality of shape points;
calculate a heading difference between each of the plurality of candidate links and the location of the road sign observation information detection;
filter one or more qualified links from the plurality of candidate links based on determining that the heading difference is within a predetermined heading difference threshold;
match the road sign observation information to at least one of the one or more qualified links based on a second distance; and
initiate an update of a map database with the at least one or more matched qualified links.

9. The apparatus of claim 8, wherein the apparatus is further caused to:
calculate a plurality of point-to-line distances between each of the one or more qualified links and the location of the road sign observation information detection;
select a smallest value of a point-to-line distance from the plurality of point-to-line distances as the second distance; and
match the road sign observation information to the at least one of the one or more qualified links based on the second distance.

10. The apparatus of claim 9, wherein the apparatus is further caused to:
adjust the matched one or more qualified links to identify at least one of an upstream link and a downstream link as a matched link for the road sign observation information based on an adjustment criteria.

11. The apparatus of claim 10, wherein the adjustment criteria comprises:
checking a length of the one or more qualified links selected for matching the at least one of the upstream link and the downstream link with the road sign observation information; and
selecting the downstream link as the matched link for the road sign observation information if the length of the one or more qualified links is lesser than a predetermined length threshold and the location of the road sign observation information detection is within 50th percentile to 100th percentile of the one or more qualified links.

12. The apparatus of claim 10, wherein the adjustment criteria comprises:
checking a length of the one or more qualified links selected for matching the at least one of the upstream link and the downstream link with the road sign observation information; and
selecting the downstream link as the matched link for the road sign observation information if the length of the one or more qualified links is greater than a predetermined length threshold and the location of the road sign observation information detection is within 75th percentile to 100th percentile of the one or more qualified links.

13. The apparatus of claim 8, wherein the first distance is in a range of 60 meters to 300 meters.

14. The apparatus of claim 8, wherein the heading difference threshold is in a range of 10 degrees to 50 degrees.

15. A computer program product comprising at least one non-transitory computer-readable storage medium having computer-executable program code instructions stored therein, the computer-executable program code instructions comprising program code instructions for:
receiving, by one or more sensors associated with a vehicle, a road sign observation information;
identifying a plurality of candidate links based on a first distance between a location of the road sign observation information detection and a plurality of shape points;
calculating a heading difference between each of the plurality of candidate links and the location of the road sign observation information detection;

filtering one or more qualified links from the plurality of candidate links based on determining that the heading difference is within a predetermined heading difference threshold;

matching the road sign observation information to at least one of the one or more qualified links based on a second distance; and initiating an update of a map database with the at least one or more matched qualified links.

16. The computer program product of claim 15, wherein matching the road sign observation information further comprises:

calculating a plurality of point-to-line distances between each of the one or more qualified links and the location of the road sign observation information detection;

selecting a smallest value of a point-to-line distance from the plurality of point-to-line distances as the second distance; and matching the road sign observation information to the at least one of the one or more qualified links based on the second distance.

17. The computer program product of claim 16 further comprising program code instructions for:

adjusting the matched one or more qualified links to identify at least one of an upstream link and a downstream link as a matched link for the road sign observation information based on an adjustment criteria.

18. The computer program product of claim 17, wherein the adjustment criteria comprises:

checking a length of the one or more qualified links selected for matching the at least one of the upstream link and the downstream link with the road sign observation information; and selecting the downstream link as the matched link for the road sign observation information if the length of the one or more qualified links is lesser than a predetermined length threshold and the location of the road sign observation information detection is within 50th percentile to 100th percentile of the one or more qualified links.

19. The computer program product of claim 17, wherein the adjustment criteria comprises:

checking a length of the one or more qualified links selected for matching the at least one of the upstream link and the downstream link with the road sign observation information; and selecting the downstream link as the matched link for the road sign observation information if the length of the one or more qualified links is greater than a predetermined length threshold and the location of the road sign observation information detection is within 75th percentile to 100th percentile of the one or more qualified links.

20. The computer program product of claim 15, wherein the first distance is in a range of 60 meters to 300 meters and the heading difference threshold is in a range of 10 degrees to 50 degrees.

* * * * *